(12) United States Patent
Pinguet et al.

(10) Patent No.: US 9,684,128 B2
(45) Date of Patent: *Jun. 20, 2017

(54) METHOD AND SYSTEM FOR COUPLING OPTICAL SIGNALS INTO SILICON OPTOELECTRONICS CHIPS

(71) Applicant: Luxtera, Inc., Carlsbad, CA (US)

(72) Inventors: Thierry Pinguet, Arlington, WA (US); Attila Mekis, Carlsbad, CA (US); Steffen Gloeckner, San Diego, CA (US)

(73) Assignee: Luxtera, Inc., Carlsbad, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/232,067

(22) Filed: Aug. 9, 2016

(65) Prior Publication Data

US 2016/0349450 A1    Dec. 1, 2016

Related U.S. Application Data

(63) Continuation of application No. 14/829,260, filed on Aug. 18, 2015, now Pat. No. 9,417,389, which is a
(Continued)

(51) Int. Cl.
*G02B 6/34* (2006.01)
*G02B 6/124* (2006.01)
(Continued)

(52) U.S. Cl.
CPC ........... *G02B 6/124* (2013.01); *G01J 1/02* (2013.01); *G01J 1/0425* (2013.01); *G02B 6/12004* (2013.01); *G02B 6/30* (2013.01); *G02B 6/34* (2013.01); *G02B 6/4208* (2013.01); *G02B 2006/12038* (2013.01);
(Continued)

(58) Field of Classification Search
CPC . G02B 6/34; G02B 6/124; G02B 6/30; G02B 2006/12107
See application file for complete search history.

(56) References Cited

U.S. PATENT DOCUMENTS 5,689,360 A    11/1997 Kurata et al.
6,856,717 B2    2/2005 Kilian
(Continued)

*Primary Examiner* — Jennifer Doan
(74) *Attorney, Agent, or Firm* — McAndrews, Held & Malloy

(57) ABSTRACT

A method and system for coupling optical signals into silicon optoelectronic chips are disclosed and may include coupling one or more optical signals into a back surface of a CMOS photonic chip comprising photonic, electronic, and optoelectronic devices. The devices may be integrated in a front surface of the chip and one or more optical couplers may receive the optical signals in the front surface of the chip. The optical signals may be coupled into the back surface of the chip via one or more optical fibers and/or optical source assemblies. The optical signals may be coupled to the grating couplers via a light path etched in the chip, which may be refilled with silicon dioxide. The chip may be flip-chip bonded to a packaging substrate. Optical signals may be reflected back to the grating couplers via metal reflectors, which may be integrated in dielectric layers on the chip.

20 Claims, 8 Drawing Sheets

Related U.S. Application Data continuation of application No. 14/513,886, filed on Oct. 14, 2014, now Pat. No. 9,109,948, which is a continuation of application No. 13/873,771, filed on Apr. 30, 2013, now Pat. No. 8,861,906, which is a continuation of application No. 13/590,821, filed on Aug. 21, 2012, now Pat. No. 8,433,162, which is a continuation of application No. 12/614,024, filed on Nov. 6, 2009, now Pat. No. 8,280,207, which is a continuation-in-part of application No. 12/500,465, filed on Jul. 9, 2009, now Pat. No. 8,168,939.

(60) Provisional application No. 61/198,660, filed on Nov. 6, 2008.

(51) Int. Cl.
*G02B 6/30* (2006.01)
*G01J 1/02* (2006.01)
*G01J 1/04* (2006.01)
*G02B 6/42* (2006.01)
*G02B 6/12* (2006.01)

(52) U.S. Cl.
CPC .............. *G02B 2006/12061* (2013.01); *G02B 2006/12104* (2013.01); *G02B 2006/12157* (2013.01)

(56) References Cited

U.S. PATENT DOCUMENTS

| | | | |
|---|---|---|---|
| 6,865,006 | B2 | 3/2005 | Sakane et al. |
| 6,969,204 | B2 | 11/2005 | Kilian |
| 7,474,826 | B2 | 1/2009 | Tallone et al. |
| 7,505,192 | B1 | 3/2009 | Zhao et al. |
| 7,961,989 | B2 | 6/2011 | Kathman et al. |
| 8,168,939 | B2 | 5/2012 | Mack et al. |
| 8,280,207 | B2 | 10/2012 | Pinguet et al. |
| 8,433,162 | B2 | 4/2013 | Pinguet et al. |
| 8,861,906 | B2 | 10/2014 | Pinguet et al. |
| 9,417,389 | B2 * | 8/2016 | Pinguet ............... G02B 6/124 |
| 2008/0055704 | A1 | 3/2008 | Neidrich et al. |
| 2010/0006784 | A1 | 1/2010 | Mack et al. |
| 2010/0209114 | A1 | 8/2010 | Gloeckner et al. |
| 2012/0163755 | A9 | 6/2012 | Pinguet et al. |

* cited by examiner

METHOD AND SYSTEM FOR COUPLING OPTICAL SIGNALS INTO SILICON OPTOELECTRONICS CHIPS

CROSS-REFERENCE TO RELATED APPLICATIONS/INCORPORATION BY REFERENCE

This application is a continuation of application Ser. No. 14/829,260 filed on Aug. 18, 2015, which is a continuation of application Ser. No. 14/513,886, filed on Oct. 14, 2014, now U.S. Pat. No. 9,109,948, which is a continuation of Ser. No. 13/873,771 filed on Apr. 30, 2013, now U.S. Pat. No. 8,861,906, which is a continuation of application Ser. No. 13/590,821 filed on Aug. 21, 2012, now U.S. Pat. No. 8,433,162, which is a continuation of application Ser. No. 12/614,024 filed on Nov. 6, 2009, now U.S. Pat. No. 8,280,207, which is a continuation in part of application Ser. No. 12/500,465 filed on Jul. 9, 2009, now U.S. Pat. No. 8,168,939. Said application Ser. No. 12/614,024 also makes reference to, claims priority to and claims the benefit of U.S. Provisional Patent Application No. 61/198,660 filed on Nov. 6, 2008. Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to signal processing. More specifically, certain embodiments of the invention relate to a method and system for coupling optical signals into silicon optoelectronic chips.

BACKGROUND OF THE INVENTION

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for integrated control system for coupling optical signals into silicon optoelectronic chips, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for coupling optical signals into silicon optoelectronic chips. Exemplary aspects of the invention may comprise coupling one or more optical signals into a back surface of a CMOS photonic chip comprising photonic, electronic, and optoelectronic devices. The photonic, electronic, and optoelectronic devices may be integrated in a front surface of the CMOS photonic chip, and one or more grating couplers may receive the one or more optical signals in the front surface of the CMOS photonic chip. The one or more optical signals may be coupled into the back surface of the CMOS photonic chip via one or more optical fibers, which may be affixed to the CMOS photonic chip utilizing epoxy. The one or more optical signals may be coupled into the back surface of the CMOS photonic chip via one or more optical source assemblies, which may be affixed to the CMOS photonic chip via epoxy. The optical signals may be coupled to the one or more grating couplers via a light path etched in the CMOS photonic chip. The etched light path may be refilled with silicon dioxide. The CMOS photonic chip may be flip-chip bonded to a packaging substrate. Optical signals that pass through the one or more grating couplers may be reflected back to the one or more grating couplers via one or more metal reflectors, which may be integrated in dielectric layers on the CMOS photonic chip.

Figure 1A:
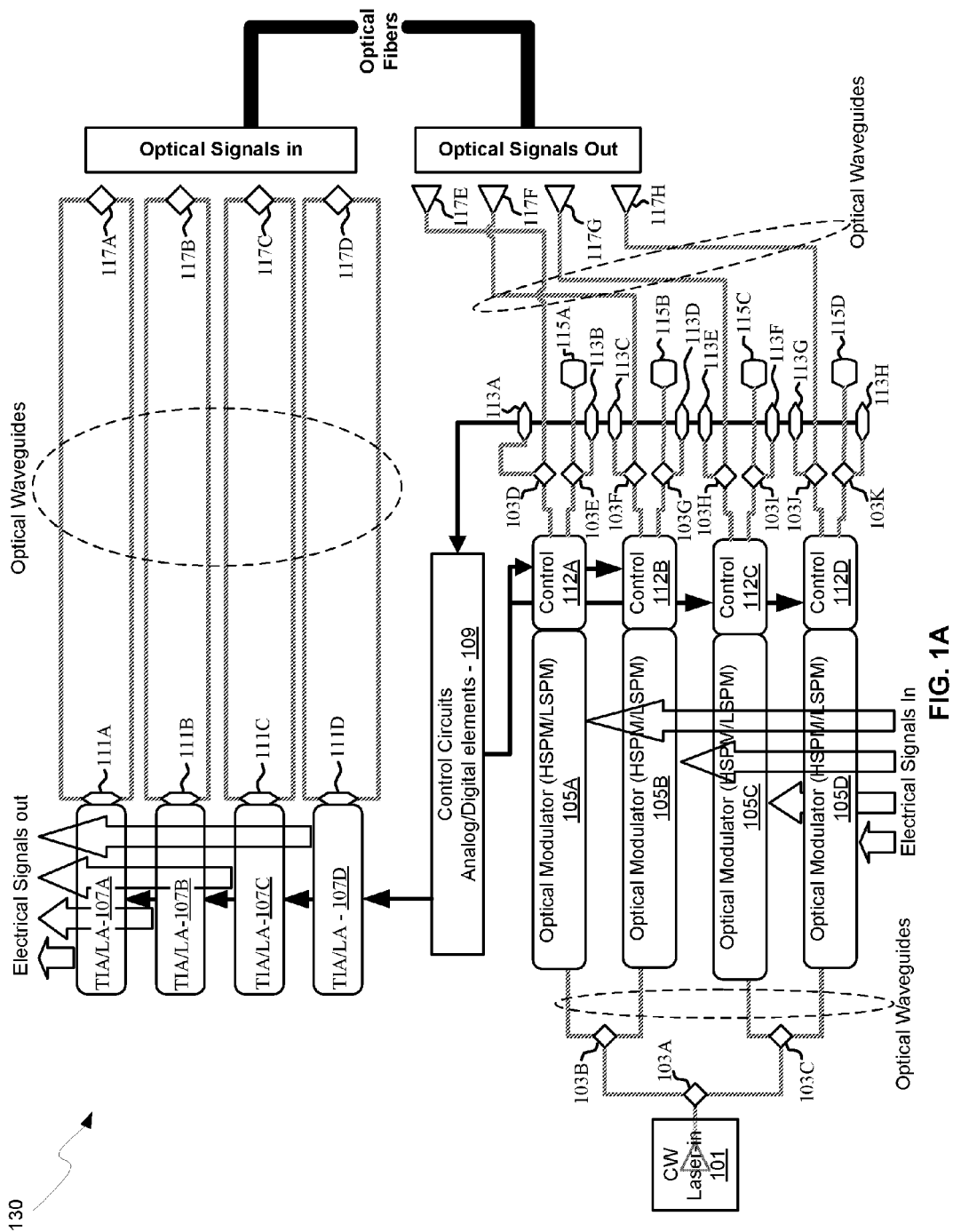
FIG. 1A is a block diagram of a photonically enabled CMOS chip, in accordance with an embodiment of the invention.

FIG. 1A is a block diagram of a photonically enabled CMOS chip, in accordance with an embodiment of the invention. Referring to FIG. 1A, there is shown optoelectronic devices on a CMOS chip 130 comprising optical modulators 105A-105D, high-speed photodiodes 111A-111D, monitor photodiodes 113A-113H, and optical devices comprising taps 103A-103K, optical terminations 115A-115D, and grating couplers 117A-117D. There is also shown electrical devices and circuits comprising transimpedance and limiting amplifiers (TIA/LAs) 107A-107D, analog and digital control circuits 109, and control sections 112A-112D. Optical signals are communicated between optical and optoelectronic devices via optical waveguides fabricated in the CMOS chip 130.

The optical modulators 105A-105D comprise Mach-Zehnder or ring modulators, for example, and enable the modulation of the CW laser input signal. The optical modulators 105A-105D comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

This mismatch between the waveguides may be intentional, such as in an imbalanced MZI, but is often unintentional in a nominally balanced MZI due to small imperfections in waveguide fabrication. The phase modulators then have a dual role: to compensate for the passive biasing of the MZI and to apply the additional phase modulation used to modulate the light intensity at the output port of the MZI according to a data stream. The former phase tuning and the latter phase modulation may be applied by separate, specialized devices, since the former is a low speed, slowly varying contribution, while the latter is typically a high speed signal. These devices are then respectively referred to as the LSPM and the HSPM. Examples for LSPM are thermal phase modulators (TPM), where a waveguide portion is locally heated up to modify the index of refraction of its constituting materials, or forward biased PIN junctions (PINPM) where current injection into the PIN junction modifies the carrier density, and thus the index of refraction of the semiconductor material. An example of HSPM is a reversed biased PIN junction, where the index of refraction is also modulated via the carrier density, but which allows much faster operation, albeit at a lower phase modulation efficiency per waveguide length.

The outputs of the modulators 105A-105D are optically coupled via waveguides to the grating couplers 117E-117H. The taps 103D-103K comprise four-port optical couplers, for example, and are utilized to sample the optical signals generated by the optical modulators 105A-105D, with the sampled signals being measured by the monitor photodiodes 113A-113H. The unused branches of the taps 103D-103K are terminated by optical terminations 115A-115D to avoid back reflections of unwanted signals.

The grating couplers 117A-117H comprise optical gratings that enable coupling of light into and out of the CMOS chip 130. The grating couplers 117A-117D are utilized to couple light received from optical fibers into the CMOS chip 130, and the grating couplers 117E-117H are utilized to couple light from the CMOS chip 130 into optical fibers. The optical fibers may be epoxied, for example, to the CMOS chip 130, and may be aligned at an angle from normal to the surface of the CMOS chip 130 to optimize coupling efficiency. In an embodiment of the invention, the optical fibers and a laser source module that generates the CW Laser In 101 signal may be coupled to the back surface of the CMOS chip 130. In this manner, the optical interface may be located on the back surface of the CMOS chip 130, and the electrical and thermal interfaces may be located on the front surface of the CMOS chip 130.

The high-speed photodiodes 111A-111D convert optical signals received from the grating couplers 117A-117D into electrical signals that are communicated to the TIA/LAs 107A-107D for processing. The analog and digital control circuits 109 may control gain levels or other parameters in the operation of the TIA/LAs 107A-107D. The TIA/LAs 107A-107D then communicate electrical signals off the CMOS chip 130.

The control sections 112A-112D comprise electronic circuitry that enable modulation of the CW laser signal received from the splitters 103A-103C. The optical modulators 105A-105D require high-speed electrical signals to modulate the refractive index in respective branches of a Mach-Zehnder interferometer (MZI), for example.

In operation, a laser source coupled to the back surface of the CMOS chip 130 may generate a CW light signal, CW Laser In 101, which may be transmitted through the substrate, or through an etched region of the substrate, to a grating coupler on the front surface of the CMOS chip 130. The received optical signal may then be processed by the optical modulators 105A-105D, for example. Similarly, optical fibers may be affixed to the back surface of the CMOS chip 130, using epoxy, for example. Optical signals may then be communicated from the optical fibers, through the back surface of the CMOS chip 130 and to one or more grating couplers on the front surface of the CMOS chip 130. By coupling optical sources to the back surface of the CMOS chip 130, the chip may then be flip-chip bonded to a package. In this manner, the back surface of the CMOS chip 130 comprises an optical interface, and the front surface comprises an electrical and thermal interface.

Figure 1B:
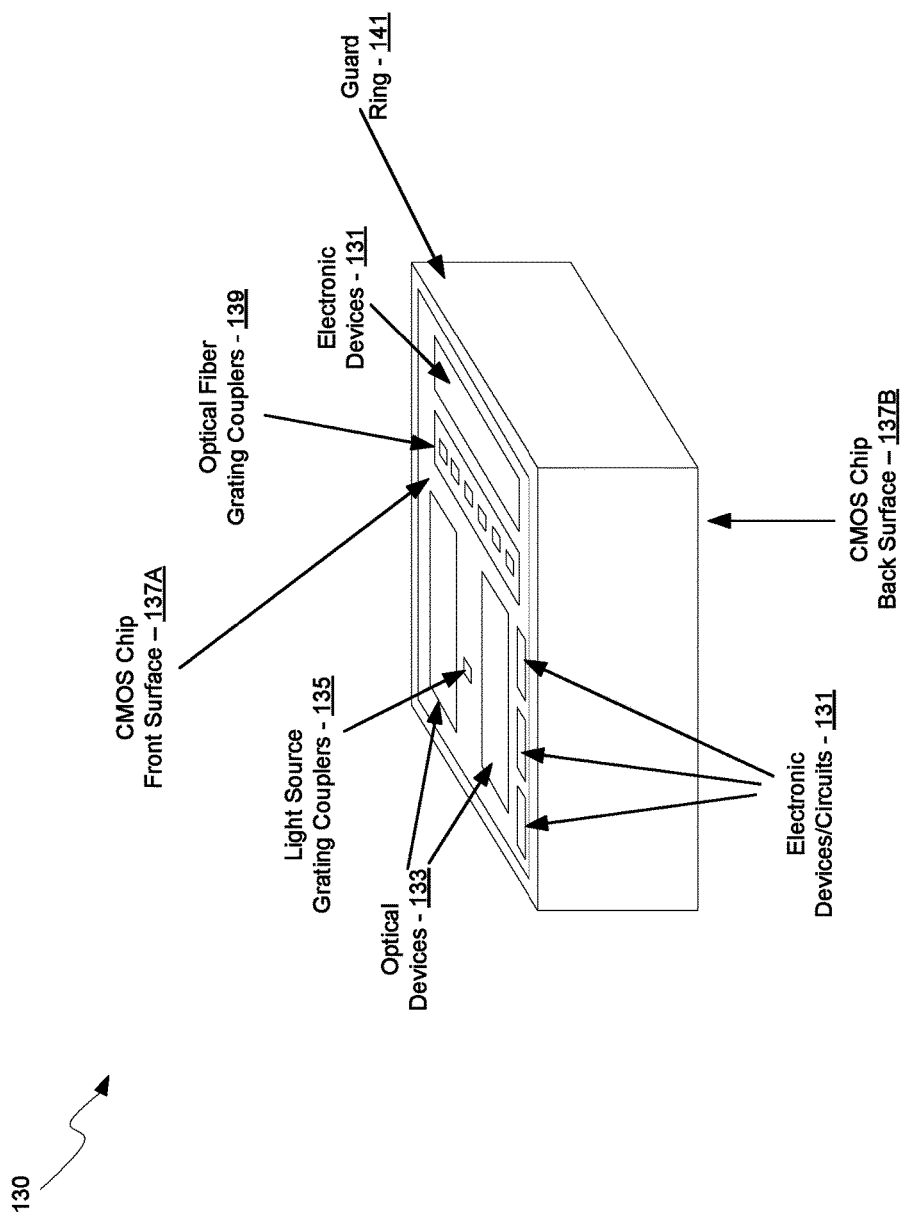
FIG. 1B is a diagram illustrating an exemplary CMOS chip, in accordance with an embodiment of the invention.

FIG. 1B is a diagram illustrating an exemplary CMOS chip, in accordance with an embodiment of the invention. Referring to FIG. 1B, there is shown the CMOS chip 130 comprising electronic devices/circuits 131, optical and optoelectronic devices 133, a light source interface 135, CMOS chip front surface 137A, CMOS chip back surface 137B, an optical fiber interface 139, and CMOS guard ring 141.

The light source interface 135 and the optical fiber interface 139 comprise grating couplers that enable coupling of light signals via the CMOS chip surface 137, as opposed to the edges of the chip as with conventional edge-emitting devices. Coupling light signals via the CMOS chip surface 137 enables the use of the CMOS guard ring 141 which protects the chip mechanically and prevents the entry of contaminants via the chip edge.

The electronic devices/circuits 131 comprise circuitry such as the TIA/LAs 107A-107D and the analog and digital control circuits 109 described with respect to FIG. 1A, for example. The optical and optoelectronic devices 133 comprise devices such as the taps 103A-103K, optical terminations 115A-115D, grating couplers 117A-117H, optical modulators 105A-105D, high-speed photodiodes 111A-111D, and monitor photodiodes 113A-113H.

In an embodiment of the invention, optical sources, such as a laser source assembly and optical fibers, may be coupled to the CMOS chip back surface 137B, whereas electrical, optical, and optoelectronic devices may be integrated in or on the CMOS chip front surface 137A. By coupling optical sources to the back surface of the CMOS chip 130, the chip may then be flip-chip bonded to a package. In this manner, the back surface of the CMOS chip 130 comprises an optical interface, and the front surface comprises an electrical and thermal interface.

Figure 1C:
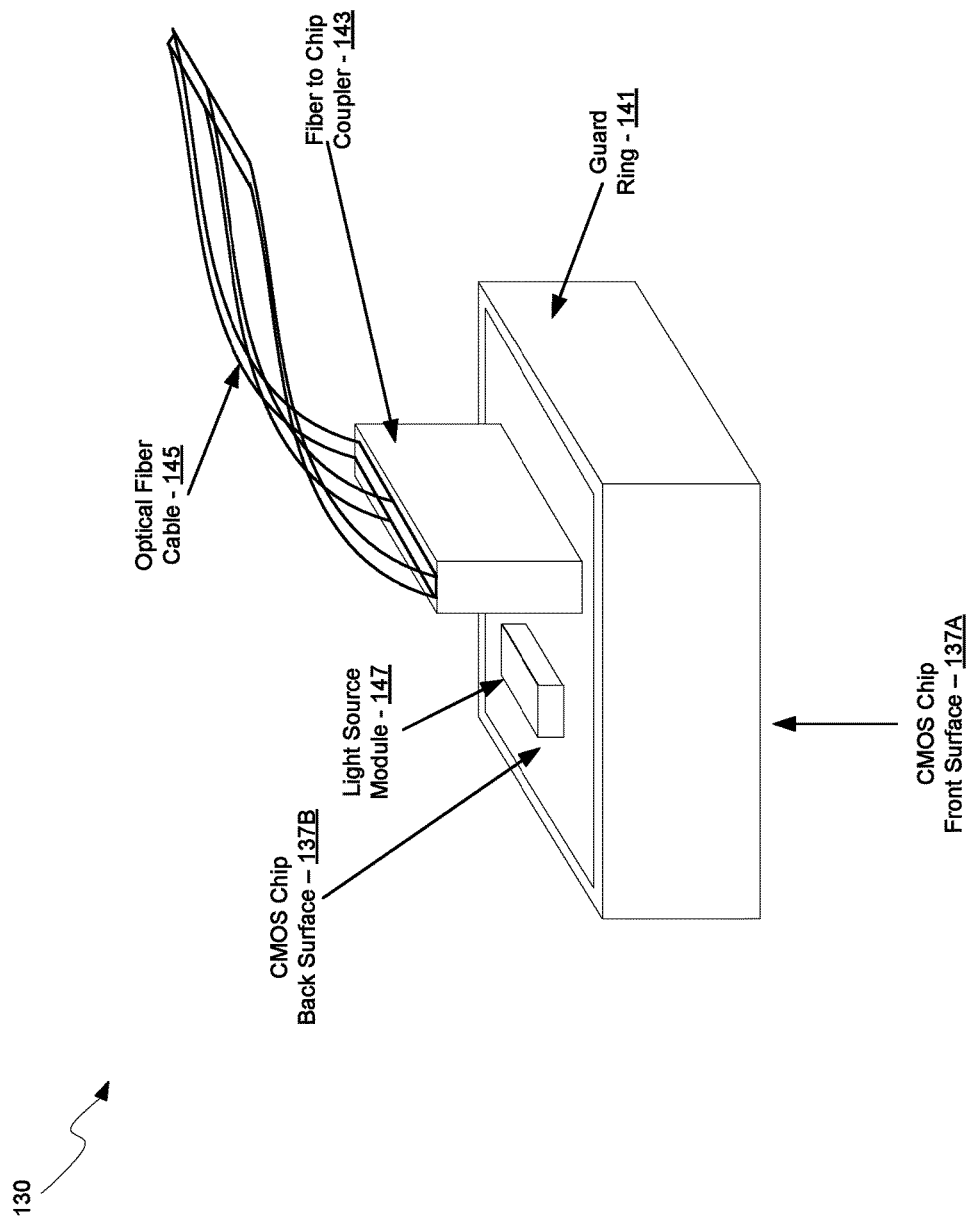
FIG. 1C is a diagram illustrating an exemplary CMOS chip coupled to an optical fiber cable, in accordance with an embodiment of the invention.

FIG. 1C is a diagram illustrating an exemplary CMOS chip coupled to an optical fiber cable, in accordance with an embodiment of the invention. Referring to FIG. 1C, there is shown the CMOS chip 130 comprising the CMOS chip front surface 137A, the CMOS chip back surface 137B, and the CMOS guard ring 141. There is also shown a fiber-to-chip coupler 143, an optical fiber cable 145, and an optical source assembly 147.

The CMOS chip 130 comprising the electronic devices/circuits 131, the optical and optoelectronic devices 133, the light source interface 135, the CMOS chip surface 137, and the CMOS guard ring 141 may be as described with respect to FIG. 1B.

In an embodiment of the invention, the optical fiber cable 145 may be affixed, via epoxy for example, to the CMOS chip back surface 137B. The fiber chip coupler 143 enables the physical coupling of the optical fiber cable 145 to the CMOS chip 130.

Similarly, the optical source assembly 147 may be affixed, via epoxy or solder, for example, to the CMOS chip back surface 137B. In this manner a high power light source may be integrated with optoelectronic and electronic functionalities of one or more high-speed optoelectronic transceivers on a single CMOS chip.

By coupling optical sources to the back surface of the CMOS chip 130, the chip may then be flip-chip bonded to a package. In this manner, the back surface of the CMOS chip 130 comprises an optical interface, and the front surface comprises an electrical and thermal interface.

Figure 2:
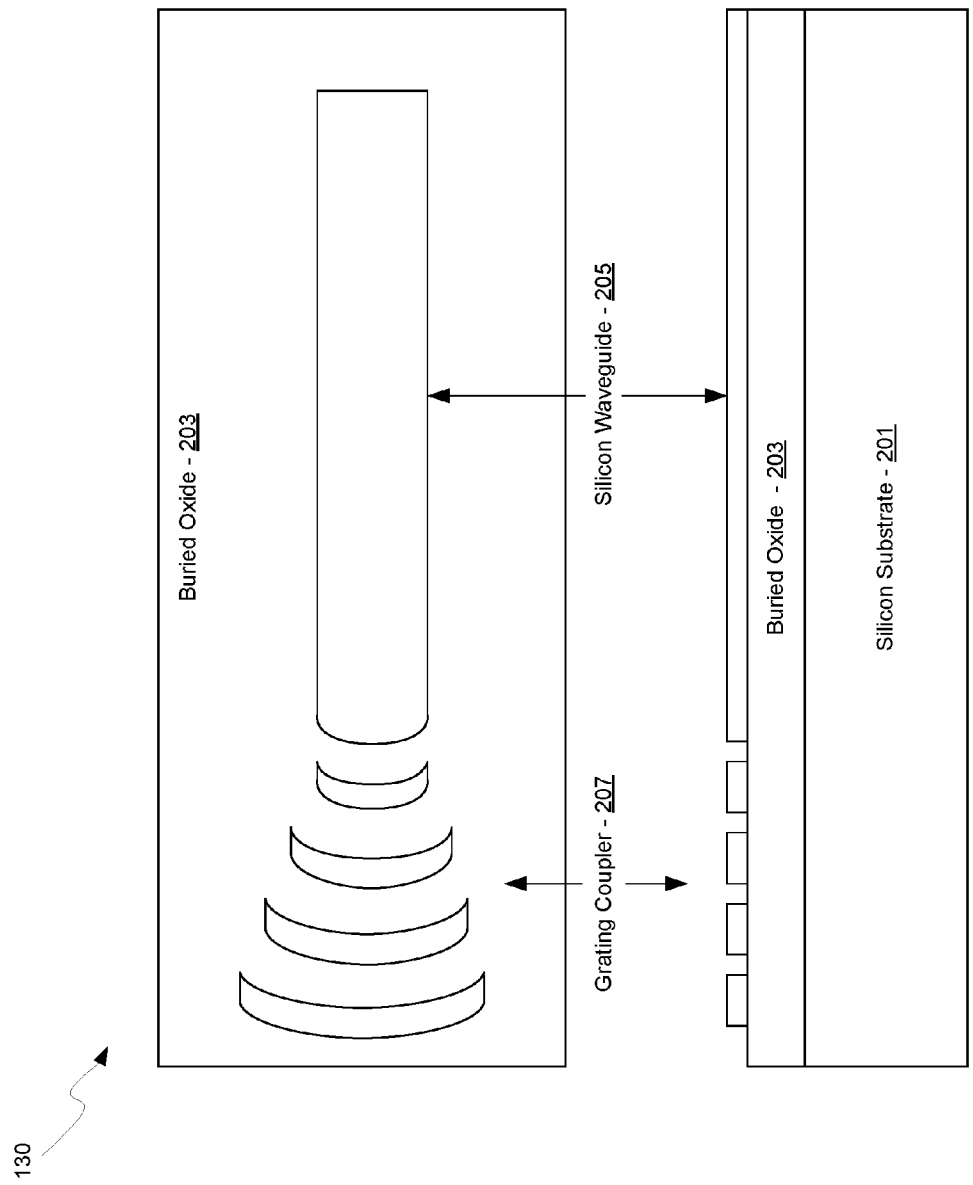
FIG. 2 is a block diagram of an exemplary grating coupler structure, in accordance with an embodiment of the invention.

FIG. 2 is a block diagram of an exemplary grating coupler structure, in accordance with an embodiment of the invention. Referring to FIG. 2, there is the CMOS chip 130 comprising a silicon substrate 201, a buried oxide 203, a silicon waveguide 205, and a grating coupler 207.

The silicon substrate 201 comprises a CMOS processed wafer, such as a silicon-on-insulator (SOI) substrate, with electronic, photonic, and optoelectronic devices, such as the grating coupler 207, which may be fabricated etched into a silicon layer deposited on the buried oxide 203. In another embodiment of the invention, the silicon layer and the buried oxide may be generated by oxygen ion implantation, thereby generating the buried oxide 203 under the silicon layer that may be fabricated into the silicon waveguide 205 and the grating coupler 207.

In an embodiment of the invention, an optical source, such as a laser source assembly or one or more optical fibers, may be coupled to the back surface of the silicon substrate 201. The optical signal may travel through the silicon substrate to the grating coupler 207 near the front surface, thereby introducing the optical power into the silicon waveguide 205. Back-side coupling is illustrated further in FIGS. 3-6.

Figure 3:
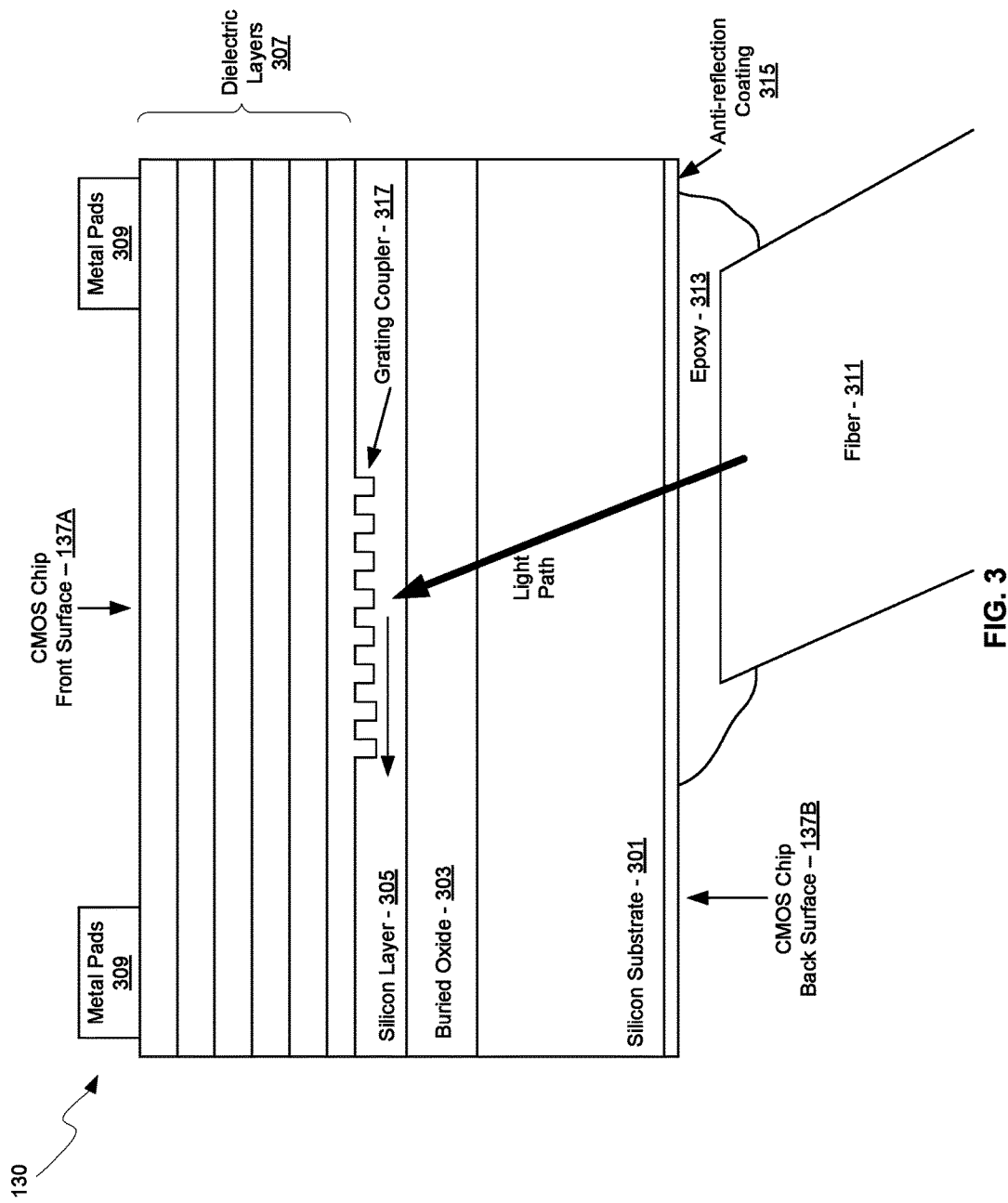
FIG. 3 is a schematic of an exemplary optical fiber coupled to the back surface of a CMOS photonic chip, in accordance with an embodiment of the invention.

FIG. 3 is a schematic of an exemplary optical fiber coupled to the back surface of a CMOS photonic chip, in accordance with an embodiment of the invention. Referring to FIG. 3, there is shown the CMOS chip 130 comprising a silicon substrate 301, a buried oxide 303, a silicon layer 305, dielectric layers 307, metal pads 309, an optical fiber 311, epoxy 313, and an anti-reflection coating 315. There is also shown the CMOS chip front surface 137A and the CMOS chip back surface 137B.

The silicon substrate 301, the buried oxide 303, the optical fiber 311, and the grating coupler 317 may be substantially similar to the silicon substrate 201, the optical fiber cable 145, and the grating coupler 207 described with respect to FIGS. 1B-2. The silicon layer 305 may comprise a deposited silicon layer that may support optical, electrical, and optoelectronic devices, such as the grating coupler 317. In another embodiment of the invention, the silicon layer 305 may be formed from the silicon substrate 301 by oxygen implantation forming the buried oxide 303 below the silicon layer 305. The silicon substrate 301 may be thinned for reduced spacing between the fiber 311 and the grating coupler 317.

The dielectric layers 307 may comprise the back-end dielectric layers of a CMOS process utilized to fabricate electrical, optical, and optoelectronic devices in the silicon substrate 301. The dielectric layers 307 may be configured to provide a reflective surface for the light path of the optical signal from the fiber 311. In another embodiment of the invention, metal layers may be incorporated in, on, and/or under the dielectric layers 307 to provide a high reflectivity surface. In this manner, a higher coupling efficiency may be obtained by the grating coupler 317. This is shown further with respect to FIG. 4.

The metal pads 309 comprise metal layers for electrical contact to electronic and optoelectronic devices fabricated in the silicon substrate 301. In another embodiment of the invention, the metal pads 309 comprise flip-chip bump bonds for coupling the CMOS chip 130 to a package, as shown in FIG. 6.

The anti-reflection coating 315 comprises one or more dielectric layers with thicknesses and dielectric constants configured to result in a low reflectivity at the CMOS chip back surface 137B, thereby minimizing optical losses.

In operation, an optical signal may be communicated from the fiber 311 to the grating coupler 317 through the silicon substrate and the buried oxide 303. The size, spacing, and orientation of the gratings in the grating coupler 317 may be configured to generate an optical signal in the plane of the silicon layer 305 from the optical signal received from the fiber 311. By coupling optical input and output structures, such as optical fibers and light source assemblies, on the CMOS chip back surface 137B, greater flexibility is enabled for locating the electrical and thermal interfaces on the CMOS chip front surface 137A. For example, the CMOS chip 130 may then be flip-chip bonded to IC packages or other chips. In addition, optical losses from the dielectric layers 307, comprising the CMOS process back-end layers, may be eliminated.

Figure 4:
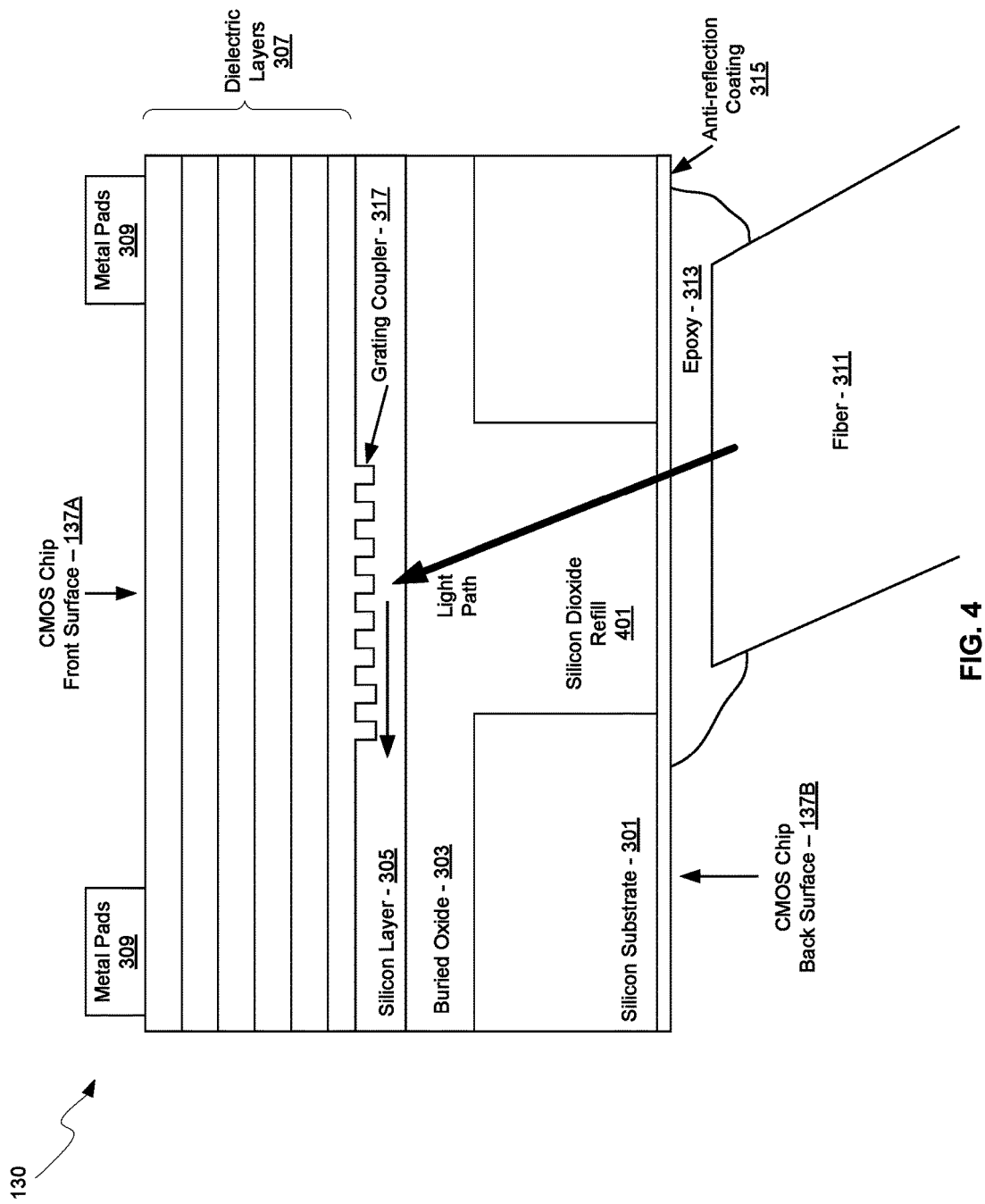
FIG. 4 is a schematic of an exemplary optical fiber coupled to the back surface of a CMOS photonic chip with an etched substrate light path, in accordance with an embodiment of the invention.
Figure 5:
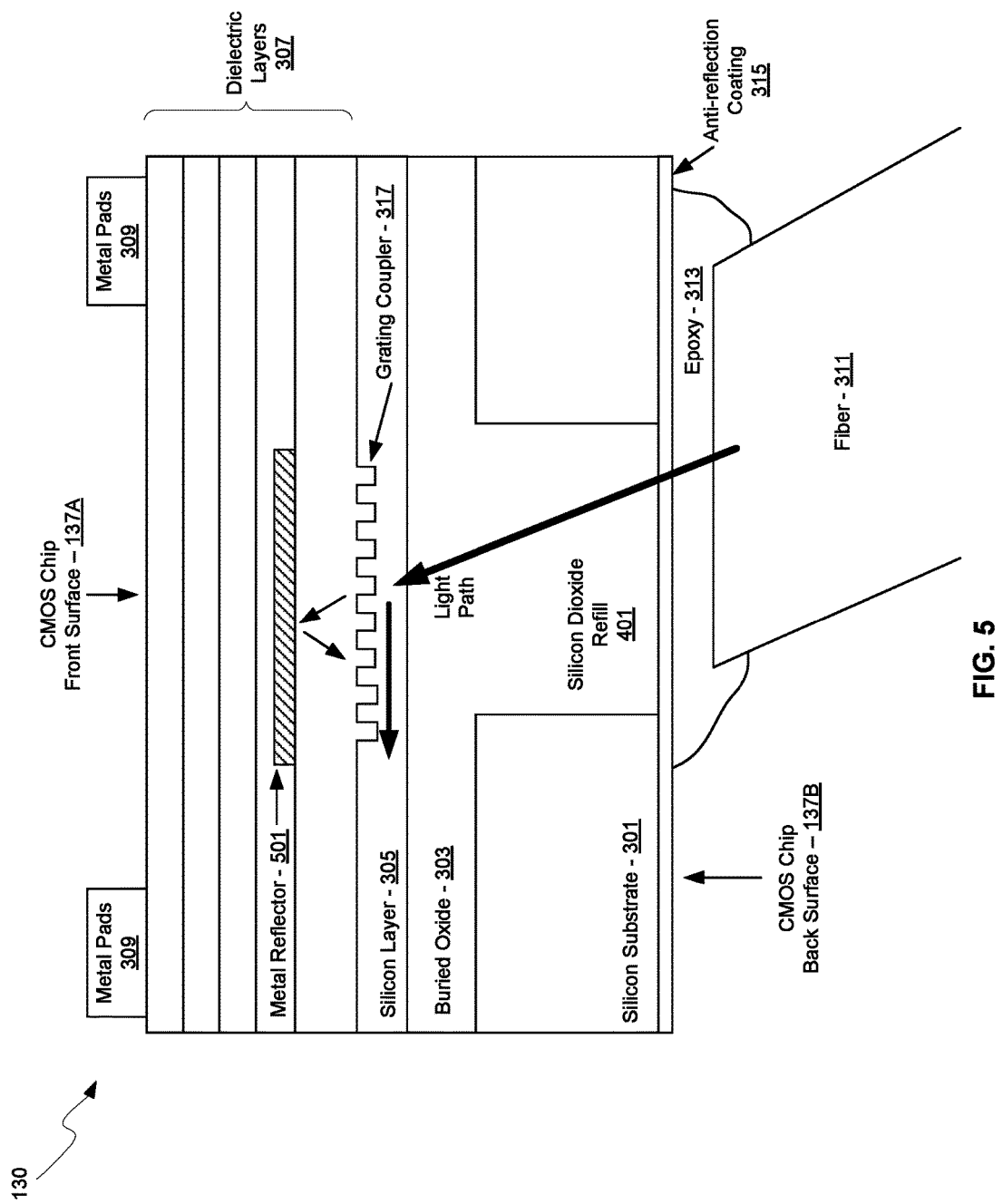
FIG. 5 is a schematic of an exemplary optical fiber coupled to the back surface of a CMOS photonic chip with an etched substrate light path and metal reflector, in accordance with an embodiment of the invention.
Figure 6:
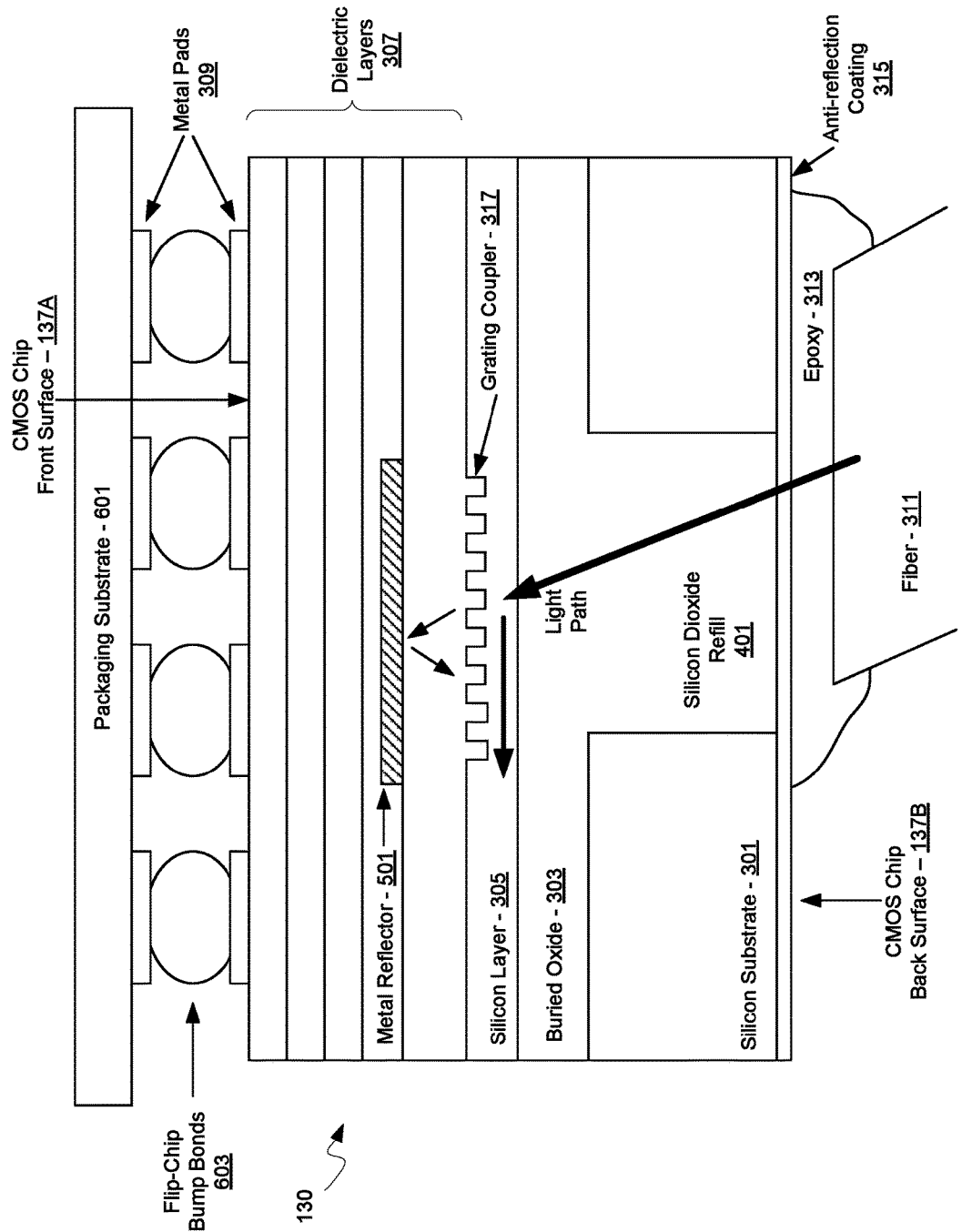
FIG. 6 is a schematic of an exemplary optical fiber coupled to the back surface of a CMOS photonic chip flip-chip bonded to a packaging substrate, in accordance with an embodiment of the invention.

The reflectivity of the interface between the silicon layer 305 and the buried oxide 303 may be up to 20%, so it would be advantageous to remove this interface from the light path, as shown in FIGS. 4-6.

FIG. 4 is a schematic of an exemplary optical fiber coupled to the back surface of a CMOS photonic chip with an etched substrate light path, in accordance with an embodiment of the invention. Referring to FIG. 4, there is shown the CMOS chip 130 comprising the silicon substrate 301, the buried oxide 303, the silicon layer 305, the dielectric layers 307, the metal pads 309, the optical fiber 311, epoxy 313, the anti-reflection coating 315, the grating coupler 317, and a silicon dioxide refill layer 401. There is also shown the CMOS chip front surface 137A and the CMOS chip back surface 137B.

The silicon substrate 301 may be etched such that the optical path of an optical signal from the fiber 311 may avoid the interface between the silicon substrate 301 and the buried oxide 303. The etched region may then be backfilled with the silicon dioxide refill layer 401, thereby eliminating one silicon/silicon dioxide interface in the light path.

In operation, an optical signal may be communicated from the fiber 311 to the grating coupler 317 through the silicon dioxide refill layer 401 and the buried oxide 303. The size, spacing, and orientation of the gratings in the grating coupler 317 may be configured to generate an optical signal in the plane of the silicon layer 305 from the optical signal received from the fiber 311. By coupling optical input and output structures, such as optical fibers and light source assemblies, on the CMOS chip back surface 137B, greater flexibility is enabled for electrical and thermal interfaces on the CMOS chip front surface 137A. For example, the CMOS chip 130 may then be flip-chip bonded to IC packages or other chips via the CMOS chip front surface 137A.

FIG. 5 is a schematic of an exemplary optical fiber coupled to the back surface of a CMOS photonic chip with an etched substrate light path and metal reflector, in accordance with an embodiment of the invention. Referring to FIG. 5, there is shown the CMOS chip 130 comprising the silicon substrate 301, the buried oxide 303, the silicon layer 305, the dielectric layers 307, the metal pads 309, the optical fiber 311, epoxy 313, the anti-reflection coating 315, the grating coupler 317, the silicon dioxide refill layer 401, and a metal reflector 501. There is also shown the CMOS chip front surface 137A and the CMOS chip back surface 137B.

The silicon substrate 301 may be etched such that the optical path of an optical signal from the fiber 311 may avoid the interface between the silicon substrate 301 and the buried oxide 303. The etched region may then be backfilled with the silicon dioxide refill layer 401, thereby eliminating one silicon/silicon dioxide interface in the light path. In addition, the metal reflector 501 may be integrated in the dielectric layers 307, thereby integrating a highly reflective surface for reflecting any optical signal that passes through the grating coupler 317 and enabling a second pass-through of the light signal through the coupler. In this manner, a higher coupling efficiency may be obtained. The metal reflector 501 may comprise aluminum, copper, titanium, platinum, or other metal, for example.

In operation, an optical signal may be communicated from the fiber 311 to the grating coupler 317 through the silicon dioxide refill layer 401 and the buried oxide 303. The size, spacing, and orientation of the gratings in the grating coupler 317 may be configured to transfer optical signal into the plane of the silicon layer 305 from the fiber 311. Optical signals not captured by the grating coupler 317 on the first pass may be reflected back to the grating by the metal reflector 501. Thus, higher coupling efficiencies, as indicated by the thicker arrow for the lateral optical signal in the grating coupler, may be obtained for the grating coupler 317 by integrating the etched substrate/silicon dioxide refill layer and the metal reflector 501. By coupling optical input and output structures, such as optical fibers and light source assemblies, on the CMOS chip back surface 137B, greater flexibility is enabled for electrical and thermal interfaces on the CMOS chip front surface 137A. For example, the CMOS chip 130 may then be flip-chip bonded to IC packages or other chips via the CMOS chip front surface 137A.

FIG. 6 is a schematic of an exemplary optical fiber coupled to the back surface of a CMOS photonic chip flip-chip bonded to a packaging substrate, in accordance with an embodiment of the invention. Referring to FIG. 6, there is shown the CMOS chip 130 comprising the silicon substrate 301, the buried oxide 303, the silicon layer 305, the dielectric layers 307, the metal pads 309, the optical fiber 311, epoxy 313, the anti-reflection coating 315, the grating coupler 317, the silicon dioxide refill layer 401, and the metal reflector 501. There is also shown a packaging substrate 601, flip-chip bump bonds 603, the CMOS chip front surface 137A, and the CMOS chip back surface 137B.

The CMOS chip 130 may be as configured in FIG. 5, but flip-chip bonded to the packaging substrate 601, which may comprise a ceramic material, for example, for housing and/or supporting the CMOS chip 130. The packaging substrate 601 may provide a thermal sink for the CMOS chip 130 in addition to mechanical support.

In an embodiment of the invention, a method and system are disclosed for coupling optical signals into silicon optoelectronic chips. Aspects of the invention may comprise coupling one or more optical signals into a back surface of a CMOS photonic chip 130 comprising photonic, electronic, and optoelectronic devices 103A-103K, 105A-105D, 107A-107D, 111A-111D, 112A-112D, 113A-113H, 115A-115D, 117A-117H, 131, 133, 135, 207, 317. The photonic, electronic, and optoelectronic devices 103A-103K, 105A-105D, 107A-107D, 111A-111D, 112A-112D, 113A-113H, 115A-115D, 117A-117H, 131, 133, 135, 207, 317 may be integrated in a front surface 137A of the CMOS photonic chip 130 and one or more grating couplers 135, 139, 207, 317 may receive the one or more optical signals in the front surface of the CMOS photonic chip 137A. The one or more optical signals may be coupled into the back surface 137B of the CMOS photonic chip 130 via one or more optical fibers 145, 311, which may be affixed to the CMOS photonic chip 130 via epoxy 313. The one or more optical signals may be coupled into the back surface 137B of the CMOS photonic chip 130 via one or more optical source assemblies 147, which may be affixed to the CMOS photonic chip 130 via epoxy 313. The optical signals may be coupled to the one or more grating couplers 135, 139, 207, 317 via a light path etched in the CMOS photonic chip 130. The etched light path may be refilled with silicon dioxide 401. The CMOS photonic chip 130 may be flip-chip bonded to a packaging substrate 601. Optical signals that pass through the one or more grating couplers 135, 139, 207, 317 may be reflected back to the one or more grating couplers 135, 139, 207, 317 via one or more metal reflectors 501, which may be integrated in dielectric layers 307 on the CMOS photonic chip 130.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing signals, the method comprising:
    in a photonic transceiver comprising a silicon photonic chip bonded to a substrate, coupling one or more optical signals into a back surface of said silicon photonic chip through a light path in a region where silicon is removed from said silicon photonic chip, wherein photonic devices are integrated in said silicon photonic chip and said one or more optical signals are received by one or more optical couplers at said front surface of said silicon photonic chip.

2. The method according to claim 1, comprising coupling said one or more optical signals into said back surface of said silicon photonic chip via one or more optical fibers.

3. The method according to claim 1, wherein said optical couplers comprise grating couplers.

4. The method according to claim 1, comprising coupling an optical source signal for said photonic transceiver into said back surface of said silicon photonic chip via an optical source assembly bonded to said silicon photonic chip.

5. The method according to claim 1, comprising coupling said one or more optical signals to said one or more grating couplers via an anti-reflective coating on said back surface of said silicon photonic chip.

6. The method according to claim 5, wherein said region where silicon is removed from said silicon photonic chip comprises silicon dioxide.

7. The method according to claim 1, wherein said front surface of said silicon photonic chip is bonded to a second chip.

8. The method according to claim 1, comprising reflecting optical signals that pass through said one or more optical couplers back to said one or more optical couplers via one or more metal reflectors.

9. The method according to claim 8, wherein said one or more metal reflectors are integrated in dielectric layers on said silicon photonic chip.

10. A system for processing signals, the system comprising:
   a photonic transceiver comprising a silicon photonic chip bonded to a die, said silicon photonic chip having photonic devices integrated in said silicon photonic chip and a light path in a region where silicon is removed from a back surface of said silicon photonic chip, wherein one or more optical signals are coupled into said back surface of said silicon photonic chip via said light path, and one or more optical couplers at said front surface of said silicon photonic chip are operable to receive said one or more optical signals.

11. The system according to claim 10, wherein said one or more optical signals are coupled into said back surface of said silicon photonic chip via one or more optical fibers coupled to said light path.

12. The system according to claim 11, wherein said light path passes through a buried oxide layer in said silicon photonic chip.

13. The system according to claim 10, wherein said optical couplers comprise grating couplers.

14. The system according to claim 10, wherein an optical source signal is coupled into said back surface of said CMOS photonic chip via an optical source assembly.

15. The system according to claim 10, wherein said one or more optical signals is coupled to said optical couplers through an anti-reflection coating on said back surface of said silicon photonic chip.

16. The system according to claim 15, wherein said region where silicon is removed from said silicon photonic chip comprises silicon dioxide.

17. The system according to claim 10, wherein said front surface of said silicon photonic chip is bonded to a second chip.

18. The system according to claim 10, wherein said photonic devices are operable to reflect optical signals that pass through said one or more grating couplers back to said one or more grating couplers via one or more metal reflectors.

19. The system according to claim 18, wherein said one or more metal reflectors are integrated in dielectric layers on said silicon photonic chip.

20. A system for processing signals, the system comprising:
   a photonic transceiver comprising a silicon photonic chip with photonic devices integrated beneath a stack of dielectric layers in said silicon photonic chip, wherein said silicon photonic chip is bonded to a second chip; and wherein one or more optical couplers integrated beneath a metal reflector embedded in said dielectric layers receive one or more optical signals coupled into a back surface of said silicon photonic chip through a region where silicon is removed from said silicon photonics chip.

* * * * *